United States Patent
Harashima et al.

(10) Patent No.: US 10,393,519 B2
(45) Date of Patent: Aug. 27, 2019

(54) FALL DETECTION SENSOR FOR RAMMER

(71) Applicants: MIKASA SANGYO CO., LTD., Chiyoda-ku, Tokyo (JP); NANO STUDIO INC., Kasukabe-shi, Saitama (JP)

(72) Inventors: Yoshinori Harashima, Satte (JP); Hideo Saito, Konosu (JP); Masahiro Ikeda, Koshigaya (JP); Kazuma Hirai, Yashio (JP); Yuki Shibuichi, Shiraoka (JP); Kazuya Kato, Kasukabe (JP)

(73) Assignees: MIKASA SANGYO CO., LTD., Tokyo (JP); NANO STUDIO INC., Saitama (JP)

( * ) Notice: Subject to any disclaimer, the term of this patent is extended or adjusted under 35 U.S.C. 154(b) by 7 days.

(21) Appl. No.: 15/747,709

(22) PCT Filed: Sep. 29, 2017

(86) PCT No.: PCT/JP2017/035670
§ 371 (c)(1),
(2) Date: Jan. 25, 2018

(87) PCT Pub. No.: WO2019/064554
PCT Pub. Date: Apr. 4, 2019

(65) Prior Publication Data
US 2019/0101388 A1    Apr. 4, 2019

(51) Int. Cl.
*G01C 9/02* (2006.01)
*H02P 3/06* (2006.01)
*H02P 3/00* (2006.01)

(52) U.S. Cl.
CPC . *G01C 9/02* (2013.01); *H02P 3/06* (2013.01)

(58) Field of Classification Search
CPC ...... H02P 1/00; H02P 1/04; H02P 3/00; H02P 3/06; H02P 3/065; H02P 8/28;
(Continued)

(56) References Cited

U.S. PATENT DOCUMENTS 6,474,300 B1    11/2002   Steffen
8,528,517 B2 *   9/2013   Fukano ................... F02B 63/04
                                                            123/198 D
(Continued)

FOREIGN PATENT DOCUMENTS

EP    2725144 A1    4/2014
JP    09043269 A    2/1997
(Continued)

OTHER PUBLICATIONS

International Search Report (ISR) and Written Opinion dated Nov. 7, 2017 issued in International Application No. PCT/JP2017/035670.

*Primary Examiner* — Anthony M Paul
(74) *Attorney, Agent, or Firm* — Holtz, Holtz & Volek PC

(57) ABSTRACT

A fall detection sensor for a rammer includes an acceleration sensor, a low-pass filter, an integrator, a first comparator, a second comparator, and control means. The second comparator compares wave patterns of input signals with a plurality of types of fall sample waves and non-fall sample waves stored in advance. The second comparator outputs a fall detection signal upon determining that the rammer has fallen when the similarity with one of the fall sample waves exceeds a threshold, and the second comparator outputs a non-fall signal upon determining that the rammer has not fallen when the similarity with one of the non-fall sample waves exceeds a threshold.

5 Claims, 1 Drawing Sheet

(58) Field of Classification Search
CPC .... H02P 23/0063; H02P 23/065; H02P 23/00;
H02P 27/00; H02P 25/14; G01C 9/02
USPC .......... 175/19, 56, 88, 89, 90, 135; 73/1.77,
73/1.79, 35.09, 570, 114.05, 114.24,
73/862.192, 152.15, 861.43, 488, 492,
73/503, 503.3, 514.02; 318/400.06,
318/400.01, 701, 782, 265, 259, 260, 262,
318/263, 270, 271, 272, 274, 276, 277
See application file for complete search history.

(56) References Cited

U.S. PATENT DOCUMENTS

| | | | | |
|---|---|---|---|---|
| 9,789,579 B2* | 10/2017 | Fukushima | ........... | F02D 41/042 |
| 2002/0039951 A1* | 4/2002 | Hasegawa | ........... | B60R 21/0132 |
| | | | | 477/183 |
| 2014/0076596 A1 | 3/2014 | Fukushima et al. | | |

FOREIGN PATENT DOCUMENTS

| | | | |
|---|---|---|---|
| JP | 2002071703 | A | 3/2002 |
| JP | 2002521609 | A | 7/2002 |
| JP | 2006104725 | A | 4/2006 |
| WO | 2009095986 | A1 | 8/2009 |

* cited by examiner

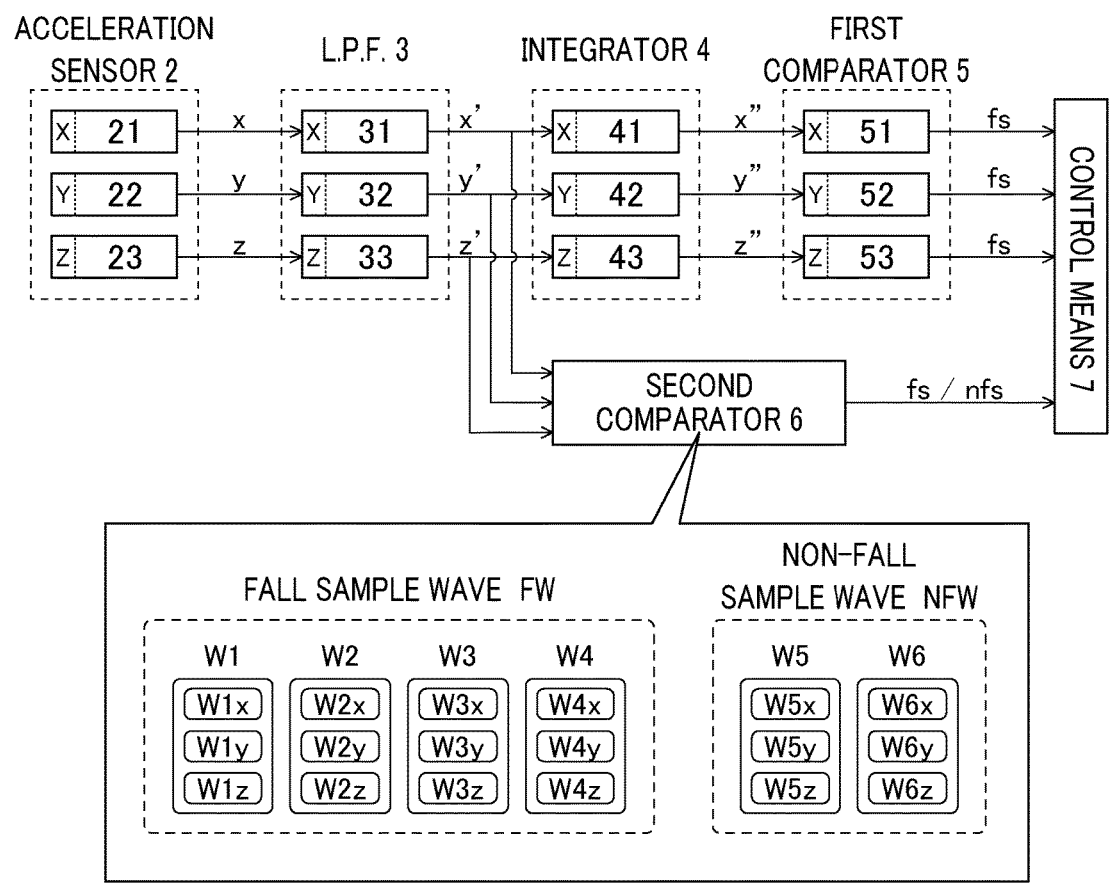

FALL DETECTION SENSOR FOR RAMMER

TECHNICAL FIELD

The present invention relates to a sensor for detecting a fall state of a rammer that compacts the ground, so that a motor (an engine, an electric motor, and the like) can be stopped immediately when the rammer falls during operation.

BACKGROUND ART

Conventionally, for a working machine and a motorcycle in which an engine is mounted, safety measures for stopping the engine have been taken. This is because, when a working machine or the like having an engine falls by accident during operation, there is a fear that the working machine goes out of control of an operator. This is also because there is another fear that leaking fuel catches fire from a spark or the like resulting from a short circuit in an electrical system, which leads to an explosion.

Means for detecting a fall state of a machine is necessary to stop an engine automatically in the event of a fall. As an example of such fall detection means, a fall detection sensor configured such that a signal output from an acceleration sensor that detects a gravitational acceleration is processed by a low-pass filter or an integrator, the processed signal is then input to a comparator, and it is determined whether the machine has fallen or not is known.

Patent Document 1: WO 2009/095986

SUMMARY OF INVENTION

Technical Problem

A fall detection sensor that uses an acceleration sensor detects an inclination angle and a fall of an application target machine body using a change in an acceleration, i.e. a gravitational acceleration, detected according to an angle of a detection axis of the acceleration sensor (for example, the detection value of the gravitational acceleration is 1 G when the detection axis is perpendicular, the detection value is 0 G when the detection axis is horizontal, and the detection value is approximately 0.7 G when the detection axis is inclined at 45°). A rammer operates so as to leap on a compaction target ground (that is, the rammer operates with a large vibration and impact in an up-down direction), and a complex motion acceleration component is strongly reflected in the acceleration value detected by the acceleration sensor. Therefore, it is very difficult to determine whether the rammer has fallen just by monitoring the detected acceleration value, and in some cases, it may be determined (erroneously) that the rammer has fallen even if the rammer has not fallen.

The present invention solves such problems of the conventional technology and an object thereof is to provide a fall detection sensor for rammer capable of determining, with high accuracy, a fall state of a rammer that operates with a large vibration and impact and stopping a motor (an engine or the like) immediately.

Solution to Problem

A fall detection sensor for rammer according to the present invention includes: an acceleration sensor configured to detect a gravitational acceleration and a motion acceleration with respect to a sensitivity direction, and to output an electrical signal having a level proportional to a magnitude of the detected acceleration; a low-pass filter configured to remove a frequency component higher than a predetermined frequency from an input signal; an integrator configured to integrate the input signal, and to output an integrated signal successively; a first comparator configured to compare a value of the input signal with a predetermined threshold, to determine that the rammer has fallen when the value of the input signal is higher or lower than the threshold, and to output a fall detection signal; a second comparator configured to compare a wave pattern of the input signal with a plurality of types of fall sample waves and non-fall sample waves stored in advance, to output a fall detection signal upon determining that the rammer has fallen when a similarity with the fall sample wave exceeds a predetermined threshold, and to output a non-fall signal upon determining that the rammer has not fallen when a similarity with the non-fall sample wave exceeds a predetermined threshold; and control means including a motor stop switch (an engine stop switch or the like), wherein the fall detection sensor for rammer is configured such that the signal output from the acceleration sensor is input to the low-pass filter, the signal output from the low-pass filter is input to the integrator and the second comparator, the signal output from the integrator is input to the first comparator, and the fall detection signal output from the first comparator and the fall detection signal and the non-fall signal output from the second comparator are input to the control means, and the fall detection sensor for rammer is configured such that, when the fall detection signal is output from the first comparator and is input to the control means, and the non-fall signal is not input from the second comparator to the control means within a predetermined period after the fall detection signal is input, and when the fall detection signal is output from the second comparator and is input to the control means, the motor stop switch operates to stop a motor (an engine or the like).

Preferably, three acceleration sensors for three axes, the sensitivity directions of which are different from each other by 90°, are provided as the acceleration sensor, three low-pass filters that individually process signals output from the three acceleration sensors are provided as the low-pass filter, three integrators that individually process three signals output from the three low-pass filters are provided as the integrator, and three first comparators that individually compare signals output from the three integrators and make determination are provided as the first comparator.

Preferably, a front fall sample wave, a rear fall sample wave, a right fall sample wave, and a left fall sample wave of the rammer are stored in advance in the second comparator as the fall sample waves, and more preferably, a half-rotation sample wave and a swing sample wave of the rammer are stored in advance in the second comparator as the non-fall sample waves.

Advantageous Effects of Invention

In the fall detection sensor for rammer of the present invention, the second comparator compares the wave patterns of the input signals with the wave patterns of the fall sample wave and the non-fall sample wave stored in advance, whereby it is possible to determine whether the rammer has fallen with higher accuracy. Moreover, the acceleration data acquired by the acceleration sensor is processed by the low-pass filter and the integrator, whereby it is possible to bring the data input to the first comparator close to acceleration data formed only of pure gravitational acceleration components. Moreover, it is possible to ideally avoid erroneous determination resulting from an abrupt shock applied to the rammer and high-frequency noise during determination of the first comparator.

BRIEF DESCRIPTION OF DRAWINGS

FIG. 1 is a block diagram of a fall detection sensor for rammer according to a first embodiment of the present invention.

DESCRIPTION OF EMBODIMENTS

Hereinafter, an embodiment of a "fall detection sensor for rammer" according to the present invention will be described with reference to the accompanying drawing. FIG. 1 is a block diagram of a fall detection sensor for rammer according to a first embodiment of the present invention. As illustrated in FIG. 1, the fall detection sensor for rammer includes an acceleration sensor 2, a low-pass filter 3, an integrator 4, a first comparator 5, a second comparator 6, and control means 7.

The acceleration sensor 2 is configured to detect a gravitational acceleration in a sensitivity direction and a motion acceleration, and to output an electrical signal (unit: V) having a level proportional to the magnitude of the acceleration. In the present embodiment, the acceleration sensor 2 includes acceleration sensors 21-23 for three axes, the sensitivity directions (the detection axes) of which are different from each other by 90°. More specifically, the acceleration sensor 2 includes an X-axis acceleration sensor 21 that faces in a horizontal direction which is a front-rear direction of the rammer when the application target rammer is at a basic attitude (the rammer is standing on a horizontal plane), a Y-axis acceleration sensor 22 that faces in a horizontal direction which is a left-right direction of the rammer, and a Z-axis acceleration sensor 23 that faces in a perpendicular direction.

Signals x-z output from the acceleration sensor 2 are input to the low-pass filter 3. The low-pass filter 3 is configured to remove a high-frequency component (a frequency component higher than a predetermined frequency) among input signals, and to pass a low-frequency component (a frequency component equal to or lower than a predetermined frequency) only therethrough (a low-frequency component only is allowed to pass therethrough by filtering). The low-pass filter 3 of the present embodiment includes three low-pass filters 31-33 so as to be able to individually process (filter) the signals x-z output from the three acceleration sensors 21-23, respectively.

The cutoff frequency of the X-axis low-pass filter 31 to which the output signal x of the X-axis acceleration sensor 21 is input can be set within the range of 10 to 50 Hz. In the present embodiment, the cutoff frequency of the low-pass filter 31 is set to 50 Hz, and a signal is output after a high-frequency component exceeding 50 Hz is removed from the input signal. Moreover, the cutoff frequency of the Y-axis low-pass filter 32 to which the output signal y of the Y-axis acceleration sensor 22 is input can be set within the range of 10 to 50 Hz. The cutoff frequency of the Z-axis low-pass filter 33 to which the output signal z of the Z-axis acceleration sensor 23 is input can be set within the range of 50 to 100 Hz.

The low-pass filter 3 (31-33) is used for avoiding erroneous determination resulting from an abrupt shock (for example, a case in which the rammer rides on a stone or an asphalt pavement to jump up greatly during compaction operation) applied to the rammer, high-frequency noise, or the like. More specifically, when the rammer receives an abrupt shock, an excessively large wave signal may be output from the acceleration sensor 2 (21-23) and an erroneous determination may be obtained. However, by processing signals using the low-pass filter 3 (31-33), it is possible to ideally remove such a component and to prevent an erroneous determination.

Signals x'-z' output from the low-pass filter 3 are input to the integrator 4. The integrator 4 integrates input signals and outputs signals successively. More specifically, successive values of the input signal in a unit time TU which ends at a certain time point T are integrated and the integrated value is output as the signal value at the time point T. The integrator 4 of the present embodiment includes three integrators 41-43 so as to be able to individually process the three signals x'-z' output from the three low-pass filters 31-33, respectively.

Integration in the integrator 4 (41-43) is successively executed rather than executed intermittently every unit time TU. Therefore, the integrator 4 outputs a continuous analog wave signal rather than a step-shaped digital wave signal.

In the present embodiment, the unit time TU is set to 0.1 seconds. Due to this, it is possible to remove an acceleration component having a frequency of 10 Hz or higher from the input signals x'-z'. Since a greater part of general motion acceleration components occurring during operation of the rammer is 10 Hz or higher, the data of acceleration (gravitational acceleration+motion acceleration) acquired by the acceleration sensor 2 can be brought close to acceleration data formed only of pure gravitational acceleration components by being processed by the integrator 4.

Signals x"-z" output from the integrator 4 are input to the first comparator 5. The first comparator 5 is configured to compare the value of an input signal with a predetermined threshold, and to output a fall detection signal fs upon determining that the rammer has fallen when the input signal value is lower or higher than the threshold. The first comparator 5 of the present embodiment includes three first comparators 51-53 so as to be able to individually compare the signals x"-z" output from the three integrators 41-43, respectively, and make determination.

Although the three signals x'-z' output from the low-pass filter 3 (31-33) are input to the integrator 4 (41-43) as described above, these three signals x'-z' are also input to the second comparator 6 as illustrated in FIG. 1. The second comparator 6 is configured to compare the wave patterns of the input signals x'-z' with a plurality of types of sample wave patterns stored in advance (to perform pattern matching), and to output a fall detection signal fs upon determining that the rammer has fallen or a non-fall signal nfs upon determining that the rammer has not fallen, when an evaluation value (similarity) thereof exceeds a predetermined threshold.

In the present embodiment, four types of fall sample waves FW and two types of non-fall sample waves NFW are stored in advance in the second comparator 6 as sample waves to be compared with the input signal waves. These sample waves are acquired in advance by causing a rammer of the same model in which the acceleration sensor 2 (21-23) and the low-pass filter 3 (31-33) illustrated in FIG. 1 are mounted to fall actually and executing a typical operation (an operation of half-rotating (reversing) and swinging the machine body back and forth) which is frequently performed during operations (compaction operation) using the rammer.

More specifically, a set of three signal waves W1x-W1z (waves having a length corresponding to the unit time)

which are output from the acceleration sensor 2 (21-23) and filtered by the low-pass filter 3 (31-33) when the rammer was fallen toward the front side of the machine body is acquired as a front fall sample wave W1. A set of three signal waves W2$x$-W2$z$ output from the acceleration sensor 2 and the low-pass filter 3 when the rammer was fallen toward the rear side of the machine body is acquired as a rear fall sample wave W2. Similarly, a set of three signal waves W3$x$-W3$z$ output from the acceleration sensor 2 and the low-pass filter 3 when the rammer was fallen toward the right side of the machine body is acquired as a right fall sample wave W3. A set of three signal waves W4$x$-W4$z$ output from the acceleration sensor 2 and the low-pass filter 3 when the rammer was fallen toward the left side of the machine body is acquired as a left fall sample wave W4. These fall sample waves W1-W4 are stored in the second comparator 6.

Furthermore, a set of three signal waves W5$x$-W5$z$ which are output from the acceleration sensor 2 and filtered by the low-pass filter 3 when the machine body was half-rotated (reversed) as a typical operation during use of the rammer is acquired as a half-rotation sample wave W5. A set of three signal waves W6$x$-W6$z$ output from the acceleration sensor 2 and the low-pass filter 3 when the machine body was swung back and forth is acquired as a swing sample wave W6. These sample waves W5, W6 are stored in the second comparator 6.

When the three signals $x'$-$z'$ output from the low-pass filter 3 (31-33) are input to the second comparator 6, waves having a predetermined length (the same length as the sample wave) are extracted from these signals $x'$-$z'$ and pattern matching is performed between the extracted waves and the front fall sample wave W1 (W1$x$-W1$z$). This pattern matching is performed for respective axes.

More specifically, pattern matching is performed between a wave pattern extracted from the input signal $x'$ for the X-axis and the sample wave W1$x$ for the X-axis among the set of front fall sample waves W1 whereby a similarity is calculated. Similarly, pattern matching is performed between a wave pattern extracted from the input signal $y'$ for the Y-axis and the sample wave W1$y$ for the Y-axis and pattern matching is performed between a wave pattern extracted from the input signal $z'$ for the Z-axis and the sample wave W1$z$ for the Z-axis whereby similarities for respective axes are calculated.

When all similarities for the X-Z-axes exceed thresholds predetermined for respective axes within the range of 50% to 70% (for example, the similarity for the X-axis is 70%, the similarity for the Y-axis is 50%, and the similarity for the Z-axis is 60%), it is determined that the rammer has fallen toward the front side of the machine body, and the fall detection signal fs is output.

Similarly, pattern matching is performed between the waves extracted from the input signals $x'$-$z'$ and the rear fall sample wave W2 (W2$x$-W2$z$), the right fall sample wave W3 (W3$x$-W3$z$), and the left fall sample wave W4 (W4$x$-W4$z$). When all similarities for the X-Z-axes in any of the pattern matching operations exceed the thresholds predetermined for the respective axes, it is determined that the rammer has fallen and a fall detection signal fs is output.

Similarly, pattern matching is performed between the waves extracted from the input signals $x'$-$z'$ and the half-rotation sample wave W5 (W5$x$-W5$z$) and the swing sample wave W6 (W6$x$-W6$z$). When all similarities for the X-Z-axes in any of the pattern matching operations exceed the thresholds predetermined for the respective axes, it is determined that the rammer has not fallen and a non-fall signal nfs is output.

When the fall detection signal fs is output from the first comparator 5, or when the fall detection signal fs or the non-fall signal nfs is output from the second comparator 6, these signals are input to the control means 7. The control means 7 has a rammer engine stop switch (a pulse short circuit) (a motor stop switch). This engine stop switch is connected to a ground line (a body) and an ignition coil. When the fall detection signal fs is output from the first comparator 5 or the second comparator 6 and is input to the control means 7, the engine stop switch operates, and a thyristor connected from the ground line toward the ignition coil is turned on whereby a minus-side voltage is lost. Due to this, an ignition plug of the engine of the rammer does not spark and the engine stops.

However, when the fall detection signal fs is output from the first comparator 5 and is input to the control means 7, the engine stop switch operates (that is, the engine stops) only when the non-fall signal nfs (output from the second comparator 6) is not input to the control means 7 within a predetermined period (in the present embodiment, within 0.5 seconds) (this period can be set within the range of 0.2 to 1.0 seconds) after the signal fs is input. In other words, even if the fall detection signal fs output from the first comparator 5 is input to the control means 7, when the non-fall signal nfs is output from the second comparator 6 within a predetermined period and is input to the control means 7, the fall detection signal fs output from the first comparator 5 is cancelled and the engine stop switch does not operate (that is, the engine does not stop).

Since the fall detection sensor for rammer of the present embodiment is configured as described above, even when the rammer to which the fall detection sensor for rammer is attached falls during operation, the fall detection sensor for rammer can determine the fall state with high accuracy.

More specifically, in this fall detection sensor for rammer, the acceleration data (the signals x-z) acquired by the acceleration sensor 2 is processed by the low-pass filter 3 and the integrator 4, whereby it is possible to bring the data (the signals $x''$-$z''$) input to the first comparator 5 close to acceleration data formed only of pure gravitational acceleration components. Moreover, it is possible to ideally avoid erroneous determination resulting from an abrupt shock applied to the rammer and high-frequency noise during determination of the first comparator 5.

Furthermore, the second comparator 6 compares the wave patterns of the input signals $x'$-$z'$ with the wave patterns of the fall sample wave FW and the non-fall sample wave NFW stored in advance, whereby it is possible to determine whether the rammer has fallen with higher accuracy.

More specifically, the compaction operation using the rammer is generally performed while linearly moving the rammer toward the front side of the machine body, and when the rammer reaches the end of a working area, the direction of the machine body is reversed by 180° and the compaction operation is resumed. Moreover, some portions within the working area may require a more intensive compaction operation than other portions. In this case, the compaction operation may be performed repeatedly by moving the rammer slightly back and forth by swinging the machine body back and forth.

When such a typical operation is performed during the compaction operation of the rammer, a large motion acceleration may be measured by any of the three acceleration sensors 21-23 (particularly, the X-axis acceleration sensor 21 and/or the Y-axis acceleration sensor 22, the sensitivity direction of which faces the horizontal direction) and a large signal value may be output. When this signal value exceeds a threshold, the fall detection signal fs may be output from the first comparator 5 (51-53).

In the present embodiment, pattern matching is performed using the non-fall sample wave NFW (the half-rotation sample wave W5 and the swing sample wave W6) acquired in advance by executing an operation of half-rotating (reversing) the machine body and swinging the machine body back and forth as a typical operation performed frequently during the compaction operation using the rammer as described above. When this pattern matching is achieved, it is determined that the rammer has not fallen, and the non-fall signal nfs is output. Therefore, even when the fall detection signal fs is output from the first comparator 5, it is possible to cancel the fall detection signal fs. Therefore, it is possible to ideally avoid erroneous determination resulting from a large motion acceleration measured by the acceleration sensor 2 although the rammer has not fallen actually.

Conversely, when the fall detection signal fs is not output from the first comparator 5 due to a certain reason although the rammer has fallen actually (when all input signals x"-z" of the first comparator 5 are not higher or lower than the threshold), it is possible to detect a fall state of the rammer by performing pattern matching using the fall sample wave FW.

Since the fall detection sensor for rammer of the embodiment is assumed to be attached to a rammer having an engine as a motor mounted thereon, the control means 7 has an "engine stop switch" as a motor stop switch, and the engine stop switch operates to stop the engine when the control means 7 determines that the rammer has fallen. The rammer, to which the fall detection sensor for rammer of the present invention is applied, is not limited to an engine-driven rammer but can be applied to an electric rammer having an electric motor as a motor mounted thereon. In this case, the control means 7 has an "electric motor stop switch" as a motor stop switch, and when the control means 7 determines that the rammer has fallen, the electric motor stop switch operates to cut the output of a driving current to the electric motor so that the electric motor stops.

Moreover, the fall detection sensor for rammer of the embodiment is configured to detect the fall state of the rammer on the basis of the acceleration data (gravitational acceleration+motion acceleration) acquired by the acceleration sensor 2. However, the fall detection sensor for rammer may include a gyro sensor (not illustrated) in addition to the acceleration sensor 2. In this case, it is possible to determine the fall state of the rammer on the basis of the acceleration data acquired by the acceleration sensor 2 and the data of angular velocity acquired by the gyro sensor. In this way, it is possible to improve the determination accuracy further.

REFERENCE SIGNS LIST 2, 21, 22, 23: Acceleration sensor
3, 31, 32, 33: Low-pass filter
4, 41, 42, 43: Integrator
5, 51, 52, 53: First comparator
6: Second comparator
7: Control means
fs: Fall detection signal
nfs: Non-fall signal
FW: Fall sample wave
NFW: Non-fall sample wave
W1: Front fall sample wave
W2: Rear fall sample wave
W3: Right fall sample wave
W4: Left fall sample wave
W5: Half-rotation sample wave
W6: Swing sample wave

The invention claimed is:

1. A fall detection sensor for rammer comprising:
an acceleration sensor configured to detect a gravitational acceleration and a motion acceleration with respect to a sensitivity direction, and to output an electrical signal having a level proportional to a magnitude of the detected acceleration;
a low-pass filter configured to remove a frequency component higher than a predetermined frequency from an input signal;
an integrator configured to integrate the input signal, and to output an integrated signal successively;
a first comparator configured to compare a value of the input signal with a predetermined threshold, to determine that the rammer has fallen when the value of the input signal is higher or lower than the threshold, and to output a fall detection signal;
a second comparator configured to compare a wave pattern of the input signal with a plurality of types of fall sample waves and non-fall sample waves stored in advance, to output a fall detection signal upon determining that the rammer has fallen when a similarity with the fall sample wave exceeds a predetermined threshold, and to output a non-fall signal upon determining that the rammer has not fallen when a similarity with the non-fall sample wave exceeds a predetermined threshold; and
control means including a motor stop switch, wherein
the fall detection sensor for rammer is configured such that the signal output from the acceleration sensor is input to the low-pass filter, the signal output from the low-pass filter is input to the integrator and the second comparator, the signal output from the integrator is input to the first comparator, and the fall detection signal output from the first comparator and the fall detection signal and the non-fall signal output from the second comparator are input to the control means, and
the fall detection sensor for rammer is configured such that, when the fall detection signal is output from the first comparator and is input to the control means, and the non-fall signal is not input from the second comparator to the control means within a predetermined period after the fall detection signal is input, and when the fall detection signal is output from the second comparator and is input to the control means, the motor stop switch operates to stop a motor.

2. The fall detection sensor for rammer according to claim 1, wherein
three acceleration sensors for three axes, the sensitivity directions of which are different from each other by 90°, are provided as the acceleration sensor,
three low-pass filters that individually process signals output from the three acceleration sensors are provided as the low-pass filter,
three integrators that individually process three signals output from the three low-pass filters are provided as the integrator, and
three first comparators that individually compare signals output from the three integrators and make determination are provided as the first comparator.

3. The fall detection sensor for rammer according to claim 1, wherein a front fall sample wave, a rear fall sample wave, a right fall sample wave, and a left fall sample wave of the rammer are stored in advance in the second comparator as the fall sample waves.

4. The fall detection sensor for rammer according to claim 1, wherein
a half-rotation sample wave and a swing sample wave of the rammer are stored in advance in the second comparator as the non-fall sample waves.

5. The fall detection sensor for rammer according to claim 1, further comprising a gyro sensor, wherein
acceleration data acquired by the acceleration sensor and angular velocity data acquired by the gyro sensor are input to the control means, and a fall state of the rammer is determined.

* * * * *